United States Patent [19]
Parish et al.

[11] Patent Number: 5,891,942
[45] Date of Patent: Apr. 6, 1999

[54] COATING COMPOSITION WITH IMPROVED WATER AND MAR RESISTANCE

[75] Inventors: David Michael Parish, Loveland; William Ronald Fron, Milford, both of Ohio

[73] Assignee: Fibre Glass-Evercoat Company, Inc., Cincinnati, Ohio

[21] Appl. No.: 847,115

[22] Filed: May 1, 1997

[51] Int. Cl.$^6$ .............................. C08K 5/09; C08K 3/34; C08K 3/02

[52] U.S. Cl. ......................... 524/284; 524/181; 524/493; 524/789; 526/318; 526/318.1

[58] Field of Search .................................. 524/181, 284, 524/493, 789; 526/318, 318.1

[56] References Cited

U.S. PATENT DOCUMENTS

| | | | |
|---|---|---|---|
| 3,665,055 | 5/1972 | Hatton, Jr. et al. | 260/862 |
| 3,873,475 | 3/1975 | Pechacek et al. | 260/2.5 B |
| 4,053,448 | 10/1977 | Holle | 260/40 R |
| 4,122,074 | 10/1978 | Pepe et al. | 526/26 |
| 4,163,073 | 7/1979 | Pepe et al. | 427/221 |
| 4,465,806 | 8/1984 | Lee | 525/31 |
| 4,489,184 | 12/1984 | Woelfel | 523/466 |
| 4,590,101 | 5/1986 | Knapcyk | 427/350 |
| 4,695,618 | 9/1987 | Mowrer | 528/55 |
| 4,716,210 | 12/1987 | Trummelmeyer et al. | 528/75 |
| 4,906,677 | 3/1990 | Barsotti et al. | 523/400 |
| 4,916,023 | 4/1990 | Kawabata et al. | 428/482 |
| 4,916,173 | 4/1990 | Otloski et al. | 523/219 |
| 4,967,956 | 11/1990 | Mansfield | 239/9 |
| 5,057,555 | 10/1991 | White et al. | 523/400 |
| 5,164,464 | 11/1992 | Hefner, Jr. et al. | 525/531 |
| 5,171,613 | 12/1992 | Bok et al. | 427/422 |
| 5,268,452 | 12/1993 | Siebert et al. | 525/437 |
| 5,292,841 | 3/1994 | Smeal et al. | 526/313 |
| 5,344,852 | 9/1994 | Brooks et al. | 521/99 |
| 5,369,201 | 11/1994 | Smeal et al. | 526/273 |
| 5,373,036 | 12/1994 | Parish et al. | 523/219 |
| 5,393,830 | 2/1995 | Smeal et al. | 525/44 |
| 5,492,668 | 2/1996 | Smeal et al. | 264/308 |
| 5,500,171 | 3/1996 | Smeal et al. | 264/309 |
| 5,501,830 | 3/1996 | Smeal et al. | 264/308 |
| 5,534,211 | 7/1996 | Smeal et al. | 264/308 |
| 5,567,766 | 10/1996 | Smeal et al. | 525/44 |
| 5,567,767 | 10/1996 | Smeal et al. | 525/44 |
| 5,571,863 | 11/1996 | Smeal et al. | 525/44 |

*Primary Examiner*—Kriellion S. Morgan
*Attorney, Agent, or Firm*—Killworth, Gottman, Hagan & Schaeff, L.L.P.

[57] ABSTRACT

The present invention is directed to a sprayable coating composition having improved water resistance, improved mar resistance and generally improved physical properties, and a method of using such a coating. The sprayable coating composition comprises a resin system comprising from about 30 to about 96 weight percent of a resin component, from about 1 to about 30 weight percent of a multifunctional acrylate component, and from about 1 to about 15 weight percent of a monofunctional acrylate component; and a catalyst component. The resin system is blended with the catalyst component, either internally or externally of a spray nozzle, and the resultant sprayable coating composition is sprayed onto a substrate. The resulting cured coating provides a surface which is water resistant, is mar resistant, and has generally improved physical properties.

20 Claims, No Drawings

COATING COMPOSITION WITH IMPROVED WATER AND MAR RESISTANCE

FIELD OF THE INVENTION

The present invention relates to a sprayable coating composition, and, more particularly, to a sprayable coating composition which has an improved water and mar resistance, and generally improved performance, and a method for using such a composition.

BACKGROUND OF THE INVENTION

Multi-component coating compositions are widely used in the plastics and marine industries. In these compositions, a liquid resin system and a catalyst for the resin system are mixed together and are sprayed onto a substrate such that the catalyst and the resin system react and harden on the substrate. The mixing may be done immediately before spraying (referred to as an internal mixing system) or immediately after spraying (referred to as an external mixing system). For example, U.S. Pat. No. 4,967,956 to Mansfield discloses a "gel coat" spraying system which uses a resin such as an epoxy resin or a polyester resin, a catalyst for the resin, and spraying means which includes an airless liquid nozzle. Such a gel coat utilizes a slow curing process.

Conventional coating compositions on articles often produce gray marks when the coating is scratched or contacted with a blunt instrument. When these marks form, the article is referred to as being "marred." Although it is not known for certain how the gray mar marks are produced, one possible explanation is that the mar is produced as a result of the coating being too soft to resist damage to its chemical structure. Another possible explanation is that when the coating is scratched, the bonds between the molecules which make up the coating are broken and produce the gray mar.

Additionally, conventional coatings can become damaged by the penetration of water and other chemicals into the chemical structure of the coating. These coatings allow water penetration because of open spaces in the polymeric structure of the coating which are produced during the polymerization reaction which forms the coating. Water penetrates into these openings and then expands when it freezes. The expansion of the water then causes the coating to crack and pit.

Accordingly, a need in the art still exists for a sprayable coating composition which may be easily applied to a variety of substrates, cures quickly, and has an improved water and mar resistance.

SUMMARY OF THE INVENTION

It is an object of the present invention to provide a sprayable coating composition for use as a coating on substrates, which cures quickly, and provides improved water and mar resistance.

The present invention is directed to a coating composition which comprises, by approximate weight percent, a resin system which comprises from about 30 to about 96 weight percent of a resin component, from about 1 to about 30 weight percent of a multifunctional acrylate component, and from about 1 to about 15 weight percent of a monofunctional acrylate component; and a catalyst component. Desirably, the resin component comprises an unsaturated high molecular weight polymer resin and a reactive diluent.

The resin system may also include up to about 2.0 wt. % of a thixotropic agent; up to about 0.5 wt. % of an activating agent; up to about 30 wt. % of a pigment; up to about 30 wt. % of a pigment extender; up to about 1.0 wt. % of an anti-settling additive; up to about 1.0 wt. % of an anti-foaming additive; up to about 0.5 wt. % of an accelerating agent; up to about 1.0 wt. % of an UV stabilizer; up to about 0.75 wt. % of a promoter; and up to about 2.0 wt. % of a co-promoter.

In a desired embodiment, the multifunctional acrylate component is selected from the group consisting of difunctional acrylates, difunctional methacrylates and mixtures thereof. In a more desired embodiment, the multifunctional acrylate component comprises a difunctional acrylate component selected from the group consisting of difunctional acrylates, difunctional methacrylates and mixtures thereof and a trifunctional acrylate component selected from the group consisting of trifunctional acrylates, trifunctional methacrylates and mixtures thereof. In the most desired embodiment, the multifunctional acrylate component is a mixture comprising from about 1 wt. % to about 15 wt. % of a difunctional acrylate component selected from the group consisting of difunctional acrylates, difunctional methacrylates and mixtures thereof and from about 1 wt. % to about 15 wt. % of a trifunctional acrylate component selected from the group consisting of trifunctional acrylates, trifunctional methacrylates and mixtures thereof.

The invention also includes a method for using a coating composition comprising: forming a resin system comprising from about 30 to about 96 weight percent of a resin component, from about 1 to about 30 weight percent of a multifunctional acrylate component, and from about 1 to about 15 weight percent of a monofunctional acrylate component; adding a catalyst component to the resin system to form a sprayable coating composition; and spraying the coating composition onto a substrate. Desirably, the resin component comprises an unsaturated high molecular weight polymer resin and a reactive diluent.

The resin system may also include up to about 2.0 wt. % of a thixotropic agent; up to about 0.5 wt. % of an activating agent; up to about 30 wt. % of a pigment; up to about 30 wt. % of a pigment extender; up to about 1.0 wt. % of an anti-settling additive; up to about 1.0 wt. % of an anti-foaming additive; up to about 0.5 wt. % of an accelerating agent; up to about 1.0 wt. % of an UV stabilizer; up to about 0.75 wt. % of a promoter; and up to about 2.0 wt. % of a co-promoter.

Desirably, the multifunctional acrylate component is a mixture comprising from about 1 wt. % to about 15 wt. % of a difunctional acrylate component selected from the group consisting of difunctional acrylates, difunctional methacrylates and mixtures thereof and from about 1 wt. % to about 15 wt. % of a trifunctional acrylate component selected from the group consisting of trifunctional acrylates, trifunctional methacrylates and mixtures thereof.

The present invention provides a sprayable coating composition which cures quickly and provides improved water and mar resistance. These and other advantages of the invention will become apparent from the following detailed description and the appended claims.

DETAILED DESCRIPTION OF THE INVENTION

The sprayable coating composition of the present invention provides many advantages over previous coatings in that it cures quickly at ambient temperature, has improved water and mar resistance, is inexpensive to produce and can be formulated to be styrene-free. The coating composition of this invention also provides generally improved physical properties. The composition may be used on a mold surface during a molding process as a "gel coat" or as a surface coating on the surface of an article. When used on an exterior surface of an article, the coated article will be provided with a smooth and glossy appearance, which is weatherable due to the water resistant character of the coating. Additionally, because the coating composition of the present invention cures at room temperature, it requires no external heat source to cure.

One aspect of the present invention is directed to a sprayable coating composition comprising a resin system and a catalyst component. The resin system comprises a resin component, a multifunctional acrylate component, and a monofunctional acrylate component. The resin component shall be discussed first.

The resin component comprises a resin and a reactive diluent. Typically, resin components are supplied by the manufacturer in this form. Desirably, the resin is an unsaturated high molecular weight polymeric resin. Useful resins are selected from the group consisting of isophthalic esters, vinyl esters, vinyl polyesters, bisphenols, unsaturated acrylic resins, and mixtures thereof. Desirably, the resin component is styrene-free, i.e., free of a styrene monomer reactive diluent. In a desired aspect of the invention, the resin component, which is used in the resin system, is DION V-7000, which is a proprietary mixture of an unsaturated isophthalic polyester resin and a vinyl toluene reactive diluent and which is provided from the manufacturer free of a styrene carrier. This resin component is available from Reichhold Chemicals, Inc. of Research Triangle Park Durham, N.C.

The reactive diluent is provided to adjust the viscosity of the resin to maintain the resin component in a liquid state for spraying and also participates in the polymerization reaction. Useful reactive diluents include vinylbenzene, styrene, vinyltoluene and mixtures thereof. The present invention desirably utilizes vinyltoluene as a diluent for the resin system instead of styrene (vinylbenzene). Vinyltoluene is safer to use than vinylbenzene because vinyltoluene has a lower vapor pressure, a higher boiling point and a higher flash point than styrene. Additionally, when vinyltoluene is used, fume hoods or special application equipment are unnecessary.

The present invention employs a combination of a multifunctional acrylate component and a monofunctional acrylate component. As used in this specification, the prefix "multi" means "having more than one," and is not restricted to two or more. For the purpose of this specification, the term "acrylate component" shall be construed to include acrylates, methacrylates and mixtures thereof. A "monofunctional" acrylate, then, is one having an average functionality of one or less.

In this invention, a multifunctional acrylate component in combination with a monofunctional acrylate component is employed to increase the crosslink density of the coating. The use of a multifunctional acrylate component in combination with a monofunctional acrylate component produces an interpenetrating network of chemical bonding having an increased amount of crosslinking. This interpenetrating network produces a surface coating which inhibits the penetration of water and other chemicals.

The coating composition is also highly resistant to marring and fading. Because of the high degree of crosslinking, the coating is particularly resistant to marring. When the surface of an article, which has been coated with the coating composition of this invention, is scratched, no gray marks are formed. Additionally, unlike aromatic acrylics, aliphatic acrylates and methacrylates have a natural resistance to ultraviolet radiation because they do not contain aromatic groups which are generally susceptible to yellowing when subjected to UV radiation. Because it employs aliphatic acrylates and methacrylates, the coating composition of this invention is also resistant to fading.

In addition to providing mar, UV and water resistance, the acrylates and methacrylates employed in the coating composition of this invention also serve as reactive diluents.

In other words, the acrylates participate in the reaction with the resin and do not evaporate, exude or plasticize as many nonreactive diluents do.

Desirably, the multifunctional acrylate component is selected from the group consisting of difunctional acrylates, difunctional methacrylates and mixtures thereof. Most desirably, the multifunctional acrylate component comprises a difunctional acrylate component selected from the group consisting of difunctional acrylates, difunctional methacrylates and mixtures thereof and a trifunctional acrylate component selected from the group consisting of trifunctional acrylates, trifunctional methacrylates and mixtures thereof.

Useful monofunctional acrylates and methacrylates include, but are not limited to, allyl methacrylate, caprolactone methacrylate, 2(2-ethoxyethoxy)ethylacrylate, ethoxylated nonyl phenol acrylate, glycidyl methacrylate, isobornyl acrylate, isbornyl methacrylate, isodecyl acrylate, isodecyl methacrylate, isoctyl acrylate, lauryl acrylate, lauryl methacrylate, 2-phenoxy acrylate, 2-phenoxy methacrylate, polypropylene glycol monomethacrylate, stearyl acrylate, stearyl methacrylate, tetrahydrofurfuryl acrylate, tetrahydrofurfuryl methacrylate, tridecyl acrylate, tridecyl methacrylate, 2-hydroxyethyl acrylate, 2-hydroxyethyl methacrylate (HEMA) and mixtures thereof.

Useful difunctional acrylates and methacrylates include, but are not limited to, alkoxylated aliphatic diacrylate, 1,4-butanediol diacrylate, 1,4-butanediol dimethacrylate, 1,3-butylene glycol diacrylate, 1,3-butylene glycol dimethacrylate, 1,6-hexanediol diacrylate (HDODA), 1,6-hexanediol dimethacrylate, neopentyl glycol diacrylate, neopentyl glycol dimethacrylate, polyethylene glycol diacrylate, polyethylene glycol dimethacrylate, propoxylated neopentyl glycol diacrylate, tetraethylene glycol diacrylate, tetraethylene glycol dimethacrylate, triethylene glycol diacrylate, triethylene glycol dimethacrylate, tripropylene glycol diacrylate and mixtures thereof.

Useful trifunctional acrylates and methacrylates include, but are not limited to, propoxylated glyceryl triacrylate, ethoxylated trimethylol propane triacrylate, pentaerythritol triacrylate, propoxylated glyceryl triacrylate, propoxylated timethylpropane triacrylate, trimethylolpropane triacrylate (TMPTA), trimethylolpropane trimethacrylate, tris (2-hydroxyethyl) isocyanurate triacrylate, tris (2-hydroxyethyl) isocyanurate trimethacrylate and mixtures thereof.

Most desirably, the coating composition of the present invention employs a HEMA as the monofunctional acrylate component, HDODA as the difunctional acrylate component and TMPTA as the trifunctional acrylate component. HDODA and TMPTA are available from Sartomer of Exton, Pennsylvania under the product designations SR 238 and SR 351, respectively. HEMA is available from Rohm & Haas of Rosemont, Ill.

The coating composition of the present invention includes a catalyst component to form a sprayable coating composition which can be sprayed onto a substrate. As used herein, the term "catalyst" refers to an organic free radical initiator. Useful catalysts are selected from the group consisting of methylethyl ketone peroxide, benzoyl peroxide, boron trifluoride, polyamine, mercaptan, isobiurane, isocyanurate and mixtures thereof. Desirably, the catalyst component will be methylethyl ketone peroxide, benzoyl peroxide or mixtures thereof. The catalyst component is present in the coating composition in an amount from about 0.5 wt. % to about 10 wt. % of the total coating composition. Desirably, the catalyst component is present in an amount from about 0.5 wt. % to about 5 wt. % of the total composition.

To increase the rate of catalysis of the polymerization reaction, the composition may include a promoter. The promoter, which is a weak catalyst itself, increases the action of the catalyst which, in turn, increases the rate of polymerization. Useful promoters include cobalt salts, potassium salts and vanadium salts of organic acids. Desirably, the promoter is selected from the group consisting of cobalt naphthenate, cobalt neodecanate, potassium 2-ethylhexanoate, and vanadium 2-ethylhexanoate, and mixtures thereof. A useful cobalt neodecanoate is available from Mooney Chemicals, Inc. of Cleveland, Ohio under the trade name 21% Cobalt Hydroxy Ten-Cem.

A useful potassium 2-ethylhexanoate is available from Mooney under the trade name Potassium Hex-Cem 977 and a useful vanadium 2-ethylhexanoate is also available from Mooney under the trade name Cur-$R_x$.

To further increase the rate of catalysis of the polymerization reaction, the coating composition of the present invention may also include a co-promoter. Useful co-promoters include metal salts of organic acids, such as, for example, potassium salts, vanadium salts, calcium salts and sodium salts of organic acids. In addition to being useful as co-promoters, potassium salts of organic acids also prevent the coating from yellowing as it cures and also help the coating retain its color over time. Desirably, the co-promoter will be potassium carboxylate which is available from Westbridge Industries of Plainfield, New Jersey under the trade name Westdry P Promoter.

To decrease curing time, the resin system may also include an accelerating agent. The coating composition of this invention typically thickens to a suitable coating in about 20 minutes. In certain situations, it is desirable to decrease the curing time of the coating. By including an accelerating agent in the composition of this invention, the curing time of the coating composition can be reduced to about 2.5 to about 3.0 minutes. One skilled in the art will realize that the choice to use an accelerating agent is application specific and thus an accelerating agent is not always necessary. Suitable accelerating agents are substituted aromatic amines and mixtures thereof. Useful accelerating agents include N,N'-dimethyl-p-toluidine (DMPT), dimethyl analine (DMA) and diethyl analine (DEA). Desirably, the accelerating agent is DMPT which is available from First Chemical Corporation of Pascagoula, Miss.

To produce a colored coating, the resin system may also include a pigment. Suitable pigments can be selected from the group consisting of inorganic pigments, organic pigments and mixtures thereof. Exemplary inorganic pigments include black iron oxide, available from Pfizer, and titanium dioxide, $TiO_2$ (Rutile), available from SCM Chemicals under the designation Tiona RCL-9. Another useful pigment is lithopone which is a white pigment comprising zinc sulfide, barium sulfate and zinc oxide. Lithopone is available from Sino-American Pigment Systems, Inc., of Emeryville, Calif. Exemplary organic pigments include phthalocyanine blues and greens, among others.

Because of the high costs of some pigments, the composition of the present invention may also include pigment extenders when pigments are used. Extenders replace a portion of the pigment to reduce the amount of pigment used in the composition and to consequently reduce the cost of the pigment. Useful extenders include lithopone, alumina trihydrate, calcium carbonate and mixtures thereof.

The resin system may optionally include a thixotropic agent. Useful thixotropic agents include hydrophilic fumed silica, hydrophobic fumed silica and organic clays. Desirably, the composition of this invention will include a hydrophilic fumed silica. If a fumed silica is used, desirably it will have a BET surface area of $200m^2/g$. A useful hydrophilic fumed silica is commercially available from DeGussa Co. of Ridgefield Park, N.J., under the trade name Aerosil 200.

To activate the fumed silica, the invention may include an activating agent. Useful activating agents are selected from the group consisting of polyethers and polyalcohols. Desirably, the activating agent will be ethylene glycol.

To prevent pigments and fillers from settling out of solution, the resin system may also include an anti-settling additive. The anti-settling additive both reduces settling and facilitates the redispersion of the pigments and fillers back into solution if they settle out. By using an anti-settling additive, the shelf life of the composition can be increased. A useful anti-settling additive is BYK®-W 966 which is a solution of polyamine amides and acidic polyesters. The formulation of this additive is proprietary to and produced by Byk-Chemie USA of Wallingford, Conn. Alternatively, fumed silicas or organoclays can be added to the composition to increase its thixotropy which, in turn, helps to maintain the pigments and other fillers in solution.

To provide the coated article with a smooth surface, the resin system of the coating composition of this invention may also include an air release agent. As the coating composition is applied to an article, air bubbles can form on the surface of the coating. As the coating cures, these air bubbles either can become entrapped in the coating or can break causing the article to have a roughened, pitted surface. To prevent air bubbles from forming, the composition can include an air release agent which reduces the amount of foam generated during the application process. In turn, when an air release agent is used, the quality of the coating surface is improved. A useful air release agent is BYK A 555, which is a proprietary air release agent produced by Byk-Chemie USA, which is located in Wallingford, Conn. Other useful air release agents are available from Estron Chemical, Inc. of Calvert City, Kans. under the trade names Resiflow LF, Resiflow L, Resiflow LV, Resiflow LX, Resiflow L-67, Resiflow LV-67, Resiflow L-237, Reisflow LH-240 and Resiflow LG-99.

If the coating composition of the present invention is intended to be used on articles which will be exposed to ultraviolet radiation, e.g. articles which will be exposed to sun light, the resin system may also include an UV stabilizer. UV stabilizers absorb UV radiation preventing the radiation from affecting the polymer portion of the coating. One skilled in the art will appreciate that an UV stabilizer is unnecessary if the coating composition is not used in an application where it will be exposed to UV radiation. Useful UV stabilizers include substituted silicon oligomers, substituted benzotriazoles and mixtures thereof. Desirably, the UV stabilizer will be a substituted silicon oligomer such as polymethylpropyl-3-oxy-[4(2,2,6,6-tetramethyl) piperidinyl]siloxane which is available from Great Lakes Chemical Corp. of West Lafayette, Ind. under the trade name Uvasil 299 HM. Another useful UV stabilizer is 2-(2'-hydroxy-5'-methylphenyl)-benzotriazole which is available from Great Lakes Chemical under the trade name Lowilite 55. Still another useful UV stabilizer is 2-(2-hydroxy-5-t-octylphenyl)-benzotriazole available from American Cyanamid Company of Wayne, N.J. under the product name Cyasorbe UV 5411. Still another useful UV stabilizer is Tinuvin 123, which is decanedioic acid, bis(2,2,6,6-tetramethyl-4-piperidinyl) ester, reaction products with 1,1-dimethylethylhydroperoxide and octane. Tinuvin 123 is available from Ciba Additives of Tarrytown, N.J.

Based upon the foregoing, the coating composition of the present invention comprises a resin system which includes from about 30 to about 96 weight percent of a resin component, from about 1 to about 30 weight percent of a multifunctional acrylate component, and from about 1 to about 15 weight percent of a monofunctional acrylate component; and a catalyst component. The resin system may optionally include up to about 2.0 wt. % of a thixotropic agent; up to about 0.5 wt. % of an activating agent; up to about 30 wt. % of a pigment; up to about 30 wt. % of a pigment extender; up to about 1.0 wt. % of an anti-settling additive; up to about 1.0 wt. % of an anti-foaming additive; up to about 0.5 wt. % of an accelerating agent; up to about 1.0 wt. % of an UV stabilizer; up to about 0.75 wt. % of a promoter; and up to about 2.0 wt. % of a co-promoter.

The multifunctional acrylate component is selected from the group consisting of difunctional acrylates, difunctional methacrylates and mixtures thereof. More desirably, the multifunctional acrylate component comprises a difunctional acrylate component selected from the group consisting of difunctional acrylates, difunctional methacrylates and mixtures thereof and a trifunctional acrylate component selected from the group consisting of trifunctional acrylates, trifunctional methacrylates and mixtures thereof. Most desirably, the multifunctional acrylate component is a mixture comprising from about 1 wt. % to about 15 wt. % of a difunctional acrylate component selected from the group consisting of difunctional acrylates, difunctional methacrylates and mixtures thereof and from about 1 wt. % to about 15 wt. % of a trifunctional acrylate component selected from the group consisting of trifunctional acrylates, trifunctional methacrylates and mixtures thereof.

In a more desired embodiment, the coating composition of the present invention comprises a resin system which comprises from about 40 to about 70 weight percent of a resin component, from about 1 to about 20 weight percent of a multifunctional acrylate component, and from about 1 to about 12 weight percent of a monofunctional acrylate component; and a catalyst component. The resin system may optionally include up to about 1.5 wt. % of a thixotropic agent; up to about 0.3 wt. % of an activating agent; up to about 20 wt. % of a pigment; up to about 20 wt. % of a pigment extender; up to about 0.75 wt. % of an anti-settling additive; up to about 0.75 wt. % of an anti-foaming additive; up to about 0.25 wt. % of an accelerating agent; up to about 0.75 wt. % of an UV stabilizer; up to about 0.5 wt. % of a promoter; and up to about 1.5 wt. % of a co-promoter.

Again, the multifunctional acrylate component is selected from the group consisting of difunctional acrylates, difunctional methacrylates and mixtures thereof. More desirably, the multifunctional acrylate component comprises a difunctional acrylate component selected from the group consisting of difunctional acrylates, difunctional methacrylates and mixtures thereof and a trifunctional acrylate component selected from the group consisting of trifunctional acrylates, trifunctional methacrylates and mixtures thereof. Most desirably, the multifunctional acrylate component is a mixture comprising from about 1 wt. % to about 10 wt. % of a difunctional acrylate component selected from the group consisting of difunctional acrylates, difunctional methacrylates and mixtures thereof and from about 1 wt. % to about 10 wt. % of a trifunctional acrylate component selected from the group consisting of trifunctional acrylates, trifunctional methacrylates and mixtures thereof.

In the most desired embodiment, the coating composition of the present invention comprises a resin system which comprises from about 50 to about 60 weight percent of an unsaturated resin component, from about 1 to about 10 weight percent of a multifunctional acrylate component, and from about 1 to about 10 weight percent of a monofunctional acrylate component; and a catalyst component. The resin system may optionally include up to about 1.0 wt. % of a thixotropic agent; up to about 0.25 wt. % of an activating agent; up to about 10 wt. % of a pigment; up to about 10 wt. % of a pigment extender; up to about 0.5 wt. % of an anti-settling additive; up to about 0.5 wt. % of an anti-foaming additive; up to about 0.10 wt. % of an accelerating agent; up to about 0.5 wt. % of an UV stabilizer; up to about 0.3 wt. % of a promoter; and up to about 1.0 wt. % of a co-promoter.

The multifunctional acrylate component is selected from the group consisting of difunctional acrylates, difunctional methacrylates and mixtures thereof. More desirably, the multifunctional acrylate component comprises a difunctional acrylate component selected from the group consisting of difunctional acrylates, difunctional methacrylates and mixtures thereof and a trifunctional acrylate component selected from the group consisting of trifunctional acrylates, trifunctional methacrylates and mixtures thereof. Most desirably, the multifunctional acrylate component is a mixture comprising from about 1 wt. % to about 5 wt. % of a difunctional acrylate component selected from the group consisting of difunctional acrylates, difunctional methacrylates and mixtures thereof and from about 1 wt. % to about 5 wt. % of a trifunctional acrylate component selected from the group consisting of trifunctional acrylates, trifunctional methacrylates and mixtures thereof.

The present invention also provides a method by which the coating composition is used. The method comprises the steps of: (a) forming a resin system comprising from about 30 to about 96 weight percent of a resin component, from about 1 to about 30 weight percent of a multifunctional acrylate component, and from about 1 to about 15 weight percent of a monofunctional acrylate component; (b) adding a catalyst component to the resin system to form a sprayable coating composition; and (c) spraying the sprayable coating composition onto a substrate through a nozzle. The components of the resin system and useful catalysts are described above. The catalyst component can be added to the resin system during the spraying step either externally or internally of the spray nozzle. For example, the catalyst component can be sprayed with the resin system and blended externally using a dual spray gun such as, for example, the PRED/FRP equipment from Binks of Franklin Park, IL. The catalyst component may also be mixed with the resin system internally of the spray coat system before spraying. One skilled in the art will appreciate that if the resin system includes an accelerator, the coating composition must be sprayed immediately after the resin system and catalyst are mixed to avoid clogging of the spray nozzle caused by the curing of the coating composition.

Desirably, the multifunctional acrylate component is a mixture comprising from about 1 wt. % to about 15 wt. % of a difunctional acrylate component selected from the group consisting of difunctional acrylates, difunctional methacrylates and mixtures thereof and from about 1 wt. % to about 15 wt. % of a trifunctional acrylate component selected from the group consisting of trifunctional acrylates, trifunctional methacrylates and mixtures thereof. More desired components which comprise the monofunctional and multifunctional acrylates are described above.

The resin system may also comprise up to about 2.0 wt. % of a thixotropic agent; up to about 0.5 wt. % of an activating agent; up to about 30 wt. % of a pigment; up to about 30 wt. % of a pigment extender; up to about 1.0 wt. % of an anti-settling additive; up to about 1.0 wt. % of an anti-foaming additive; up to about 0.5 wt. % of an accelerating agent; up to about 1.0 wt. % of an UV stabilizer; up to about 0.75 wt. % of a promoter; and up to about 2.0 wt. % of a co-promoter. More desired concentrations of the components of the resin system are described above.

The coating composition of the present invention cures at room temperature. Because it cures at room temperature, expensive heat curing equipment, such as an external heat source or oven, is unnecessary. Further, the quick curing time makes the coating composition of this invention convenient to use. Finally, because it can be formulated to be free of a vinylbenzene monomer, it is unnecessary to use a fume hood during its application.

While certain representative embodiments and details have been shown for purposes of illustrating the invention, it will be apparent to those skilled in the art that various changes in the formulations and methods disclosed herein may be made without departing from the scope of the invention, which is defined in the appended claims.

What is claimed is:

1. A sprayable coating composition comprising, by approximate weight percent:
    a resin system comprising from about 30 to about 96 weight percent of a resin component including a resin and a reactive diluent, from about 1 to about 30 weight percent of a mixture of a difunctional acrylate component selected from the group consisting of alkoxylated aliphatic diacrylate, 1,4-butanediol diacrylate, 1,4-butanediol dimethacrylate, 1,3-butylene glycol diacrylate, 1,3-butylene glycol dimethacrylate, 1,6-hexanediol diacrylate (HDODA), 1,6-hexanediol dimethacrylate, neopentyl glycol diacrylate, neopentyl glycol dimethacrylate, polyethylene glycol diacrylate, polyethylene glycol dimethacrylate, propoxylated neopentyl glycol diacrylate, tetraethylene glycol diacrylate, tetraethylene glycol dimethacrylate, triethylene glycol diacrylate, triethylene glycol dimethacrylate, tripropylene glycol diacrylate and mixtures thereof and a trifunctional acrylate component, selected from the group consisting of propoxylated glyceryl triacrylate, ethoxylated trimethylol propane triacrylate, pentaerythritol triacrylate, propoxylated glyceryl triacrylate, propoxylated timethylpropane triacrylate, trimethylolpropane triacrylate (TMPTA), trimethylolpropane trimethacrylate, tris (2-hydroxyethyl) isocyanurate triacrylate, tris (2-hydroxyethyl) isocyanurate trimethacrylate and mixtures thereof and from about 1 to about 15 weight percent of a monofunctional acrylate component; and a catalyst component.

2. The composition of claim 1 wherein the resin component is styrene free.

3. The coating composition of claim 2 wherein the resin is selected from the group consisting of isophthalic esters, vinyl esters, vinyl polyesters, bisphenols, unsaturated acrylic resins, and mixtures thereof.

4. The composition of claim 1 wherein the monofunctional acrylate component is selected from the group consisting of allyl methacrylate, caprolactone methacrylate, 2(2-ethoxyethoxy)ethylacrylate, ethoxylated nonyl phenol acrylate, glycidyl methacrylate, isobornyl acrylate, isobornyl methacrylate, isodecyl acrylate, isodecyl methacrylate, isoctyl acrylate, lauryl acrylate, lauryl methacrylate, 2-phenoxy acrylate, 2-phenoxy methacrylate, polypropylene glycol monomethacrylate, stearyl acrylate, stearyl methacrylate, tetrahydrofurfuryl acrylate, tetrahydrofurfuryl methacrylate, tridecyl acrylate, tridecyl methacrylate, 2-hydroxyethyl acrylate, 2-hydroxyethyl methacrylate (HEMA) and mixtures thereof.

5. The composition of claim 1 further including up to about 0.75 weight percent of a polymerization promoter.

6. The composition of claim 5 wherein the polymerization promoter is a cobalt salt of an organic acid.

7. The composition of claim 5 further including up to about 2 weight percent of a co-promoter.

8. The composition of claim 7 wherein the co-promoter is a potassium salt of an organic acid.

9. The composition of claim 1 further including up to about 1.0 weight percent of an air release agent selected from the group consisting of a solution of foam destroying polymers, polydimethylsiloxanes and mixtures thereof.

10. The composition of claim 1 further including up to about 1.0 weight percent of an anti-settling additive selected from the group consisting of a solution of polyamine amides and acidic polyesters, organoclays and mixtures thereof.

11. The composition of claim 1 further including up to 30 weight percent of a pigment.

12. The composition of claim 11 wherein the pigment is selected from the group consisting of organic pigments, inorganic pigments and mixtures thereof.

13. The composition of claim 12 further including up to about 30 weight percent of a pigment extender selected from the group consisting of alumina trihydrate, calcium carbonate, lithopone and mixtures thereof.

14. The composition of claim 1 further including up to about 2.0 weight percent of a thixotropic agent selected from the group consisting of hydrophilic fumed silica, hydrophobic fumed silica, and organoclay compounds.

15. The composition of claim 14 further including up to about 0.5 weight percent of a synergist for the thixotropic agent.

16. The composition of claim 1 further including up to 1.0 weight percent of a UV stabilizer.

17. The composition of claim 1 further including up to about 0.5 weight percent of on accelerating agent.

18. The composition of claim 1 wherein the resin system comprises from about 40 to about 70 weight percent of the resin component; from about 1 to about 15 weight percent of the difunctional acrylate component and from about 1 to about 15 weight percent of the trifunctional acrylate component and from about 1 to about 12 weight percent of the monofunctional acrylate component.

19. The composition of claim 18 further comprising up to about 1.5 wt. % of a thixotropic agent; up to about 0.3 wt. % of an activating agent; up to about 20 wt. % of a pigment; up to about 20 wt. % of a pigment extender; up to about 0.75 wt. % of an anti-settling additive; up to about 0.75 wt. % of an anti-foaming additive; up to about 0.25 wt. % of an accelerating agent; up to about 0.75 wt. % of an UV stabilizer; up to about 0.5 wt. % of a promoter; and up to about 1.5 wt. % of a co-promoter.

20. The composition of claim 19 further comprising up to about 1.0 wt. % of a thixotropic agent; up to about 0.25 wt. % of an activating agent; up to about 10 wt. % of a pigment; up to about 10 wt. % of a pigment extender; up to about 0.5 wt. % of an anti-settling additive; up to about 0.5 wt. % of an anti-foaming additive; up to about 0.10 wt. % of an accelerating agent; up to about 0.5 wt. % of an UV stabilizer; up to about 0.3 wt. % of a promoter; and up to about 1.0 wt. % of a co-promoter.

* * * * *